J. R. THOMAS.
Dies for Forming the Eyes of Tools.

No. 166,568.  Patented Aug. 10, 1875.

WITNESSES:
C. Neveux
H. F. Terry

INVENTOR:
J. R. Thomas
BY
ATTORNEYS.

ced correspondingly

UNITED STATES PATENT OFFICE.

JOHN R. THOMAS, OF HAMILTON, OHIO.

IMPROVEMENT IN DIES FOR FORMING THE EYES OF TOOLS.

Specification forming part of Letters Patent No. 166,568, dated August 10, 1875; application filed May 15, 1875.

*To all whom it may concern:*

Be it known that I, JOHN R. THOMAS, of Hamilton, in the county of Butler and State Ohio, have invented a new and useful Improvement in Adjustable Punches and Dies, of which the following is a specification:

The object of this invention is to furnish an improved adjustable punch and die for forming the eyes of agricultural and other tools, such as a hoe, axe, adze, &c., so that the diameters and shapes of the eyes may be varied without the necessity of having a corresponding number and variety of dies and punches for the purpose. The stock of the punch is slitted transversely, and the divided parts may be expanded or spread more or less by means of a tapering pin. A tapering nut screws on the stock or body of the punch, and constitutes the punch proper. The punch is employed with a die, whose size of aperture is adjustable, as hereinafter described.

Figure 1:
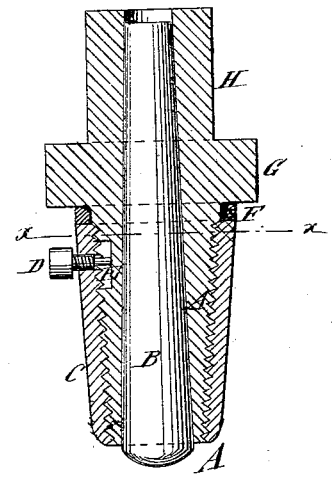
Figure 2:
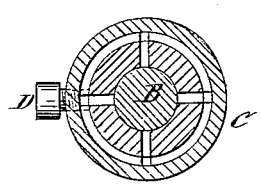
Figure 3:
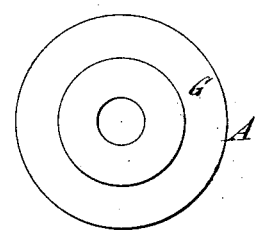
Figure 4:
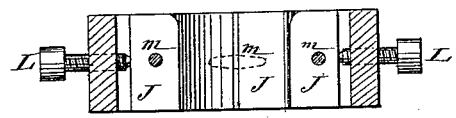
Figure 6:
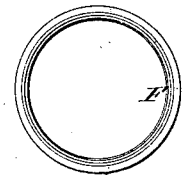
Figure 5:
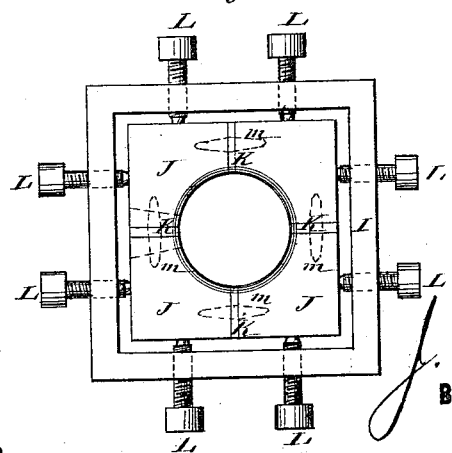

In the accompanying drawing, Figure 1 is a longitudinal section of the adjustable punch. Fig. 2 is a cross-section of Fig. 1, taken on the line $x\ x$. Fig. 3 is a top view of the punch. Fig. 4 is a cross-section of the die. Fig. 5 is a top view of the same. Fig. 6 is a view of a steel washer to fit the punch-stock used next the collar to elongate the same.

Similar letters of reference indicate corresponding parts.

A is the stock or body of the punch. B is a tapering pin, which is driven into a tapering hole made through the punch. C is a tapering nut, having a set-screw, D, the end of which set-screw enters a slot, E, in the punch-stock. This nut may be of any form exteriorly, as round, oval, or square, according to the shape required. F is a washer, which may be of any suitable thickness to elongate the punch from the collar G. The nut C may work (or be screwed) back and forth to vary the size of the hole it makes. The slot E may be longer or shorter. The set-screw D keeps the nut from turning. The body of the punch is slotted longitudinally, as seen in Fig. 2, up to and through the collar G from its end, so that by driving in the tapering pin it may be expanded to fit the nut.

To increase the length of the punch a washer of suitable size is placed against the collar G, substantially as seen at F.

The nut may project beyond the end of the stock A to the extent of the thickness of the washers employed. It is also apparent that the diameter or the size of the punch proper will be increased correspondingly—that is to say, increasing the length of the punch, (which is effected by screwing the tapered nut C downward and placing one or more washers, F, on stock A,) enables it to form larger holes or eyes in the blank, since the nut then enters the blank farther than before.

The parallelism between the inner sides of the nut and the sides of the stock A will be, to a certain extent, destroyed by such adjustment of the nut downward, but its effectiveness will not be thereby destroyed, for the respective screw-threads will still engage more or less perfectly, and the collars F firmly support the nut during the operation of punching.

A small hole is first drilled in the blank, wherein the larger hole for the eye is to be formed, and the blank being heated red hot, the punch readily penetrates it at the point where such drill-hole has been formed.

H is the shank which enters the socket of the drop-press. I represents the frame in which the die-sections are set. J represents the sections, which may be four (more or less) in number, and of any required shape, as round, oval, square, &c. As seen in the drawing, the die is made in four sections, separated by steel or metallic plates K, which plates may be varied in thickness and changed, as may be required, to vary the size of the hole to suit the punch. These sections are adjusted by means of set-screws L in the frame I. To prevent the sections from dropping from the frame or becoming displaced I introduce dowel-pins $m$. (Seen in dotted lines in the drawing.)

Having thus described my invention, I claim as new and desire to secure by Letters Patent—

1. The combination, with the tapered and slitted die-stock A, of the correspondingly-shaped nut C, and pin B, and a collar or ring, F, as and for the purpose specified.

2. The combination of the adjustable punch with a die, constructed substantially as described.

JOHN R. THOMAS.

Witnesses:
F. HORSSNYDER,
J. W. BERKSTRESSER.